Figure 1:
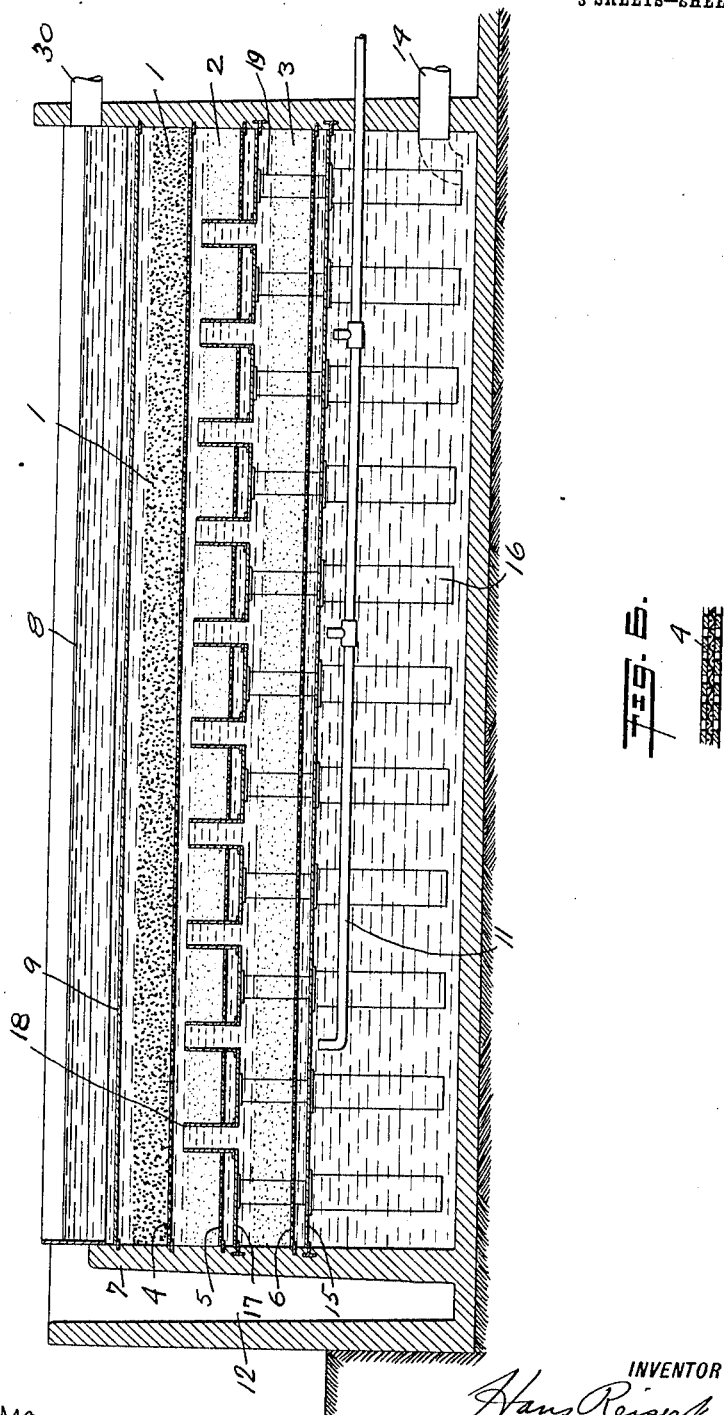

H. REISERT.
FILTER.
APPLICATION FILED JUNE 26, 1913.

1,088,929.

Patented Mar. 3, 1914.
3 SHEETS—SHEET 1.

H. REISERT.
FILTER.
APPLICATION FILED JUNE 26, 1913.

1,088,929.

Patented Mar. 3, 1914.
3 SHEETS—SHEET 2.

WITNESSES
Frederick Kunz
H. M. Bayles.

INVENTOR
Hans Reisert
By N. F. Bissing
his Attorney

H. REISERT.
FILTER.
APPLICATION FILED JUNE 26, 1913.

1,088,929.

Patented Mar. 3, 1914.
3 SHEETS—SHEET 3.

WITNESSES
Frederick Kunz
H. M. Bayler

INVENTOR
Hans Reisert
BY W. J. Bissing
ATTORNEYS

UNITED STATES PATENT OFFICE.

HANS REISERT, OF COLOGNE, GERMANY.

FILTER.

1,088,929.  Specification of Letters Patent.  Patented Mar. 3, 1914.

Application filed June 26, 1913. Serial No. 775,978.

*To all whom it may concern:*

Be it known that I, HANS REISERT, a subject of the Empire of Germany, and residing in Cologne, Germany, have invented a new and useful Improvement in Filters, of which the following is a specification.

This invention relates to filters, and the object is to provide an improved construction of filter having a plurality of beds, whereby large capacity can be secured in small space or the filtering action can be differentiated, according to the particular purposes in view, and whereby, also, all the beds can be washed out by single means for producing rapid backward flow of clear water.

The invention accordingly comprises a plurality of filter beds, which are superposed one above the other, and a chamber of adequate capacity below the beds for the reception of filtered water from all of them, so that by the introduction of air under pressure into this chamber the clear water can be driven back through the several beds so as to thoroughly wash out the accumulated impurities, this action being promoted by the agitation of the material of the beds caused by the forceful flow of the wash water.

In one embodiment of the invention the filters comprise a coarse or pre-filter bed, to which the unfiltered water is supplied, and two or more beds of relatively fine material below the pre-filter bed, together with provisions whereby the water which percolates through the pre-filter is divided so that different parts thereof flow through the different fine beds, the filtrates from the latter rejoining in the chamber or reservoir beneath. In this way the speed of filtration through the fine beds is one-half or one-third or other fraction, according to the number of these beds, of the speed through the coarse or prefilter bed, which is an advantage since the filtering off of the bacteria which is effected in the fine beds demands a slower speed of filtration than the removal of the mere mechanical impurities which are taken out in the pre-filter bed. Moreover, in the washing-out operation, also, the speed with which the clear water passes through the fine beds is less than the speed with which the reunited washing currents pass through the pre-filter bed, and this is as it should be because the secondary beds being of fine material loosen themselves more easily than the pre-filter bed, which is composed of heavier material, and, also, because the mud which is taken off from the secondary beds is finer and can consequently be removed more easily than the mud from the coarse filter, which demands a strong backwash for its removal. In another embodiment of the invention the raw water is divided among all of the filter beds, in which case the latter may all be of the same kind of material.

In the accompanying drawings I illustrate two specific constructions embodying the principles of my invention, but it will be apparent to those skilled in the art that numerous other embodiments are possible.

Figure 2:
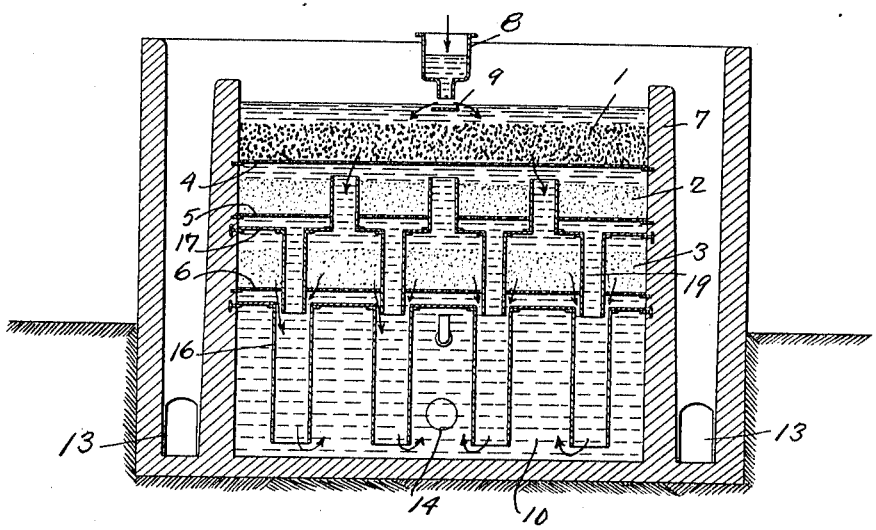
Figure 3:
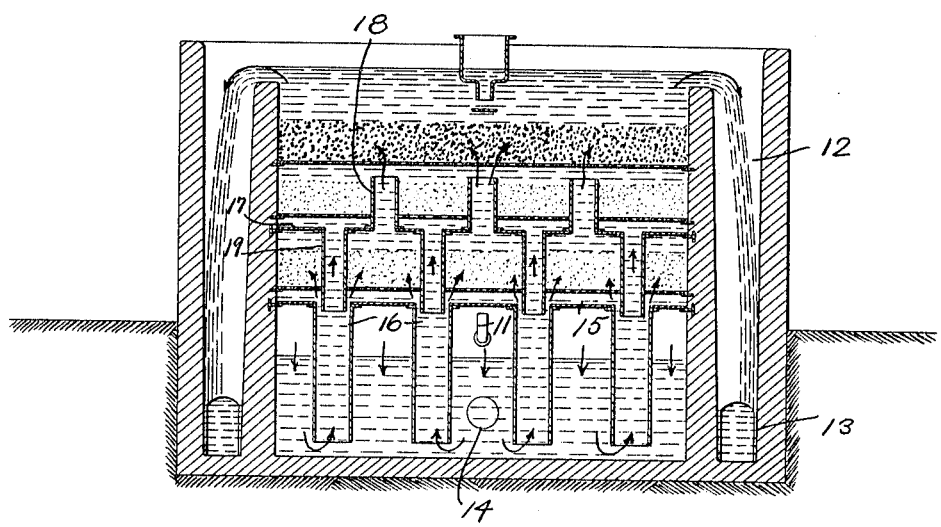
Figure 4:
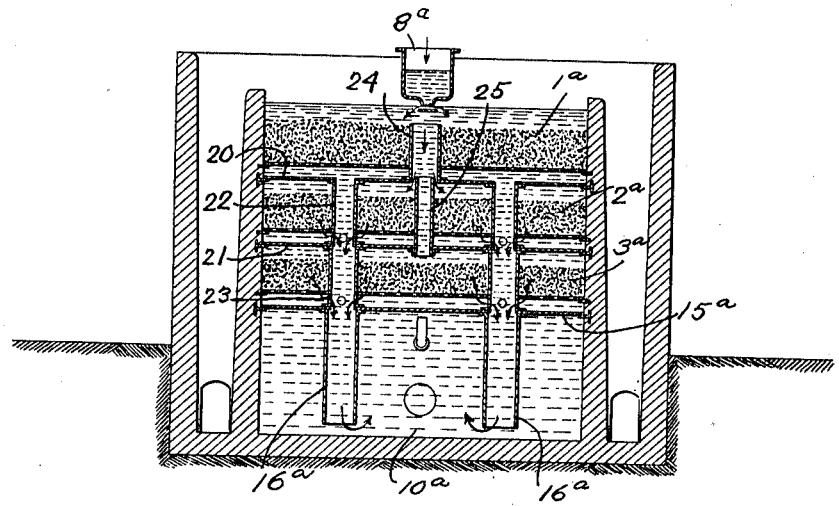
Figure 5:
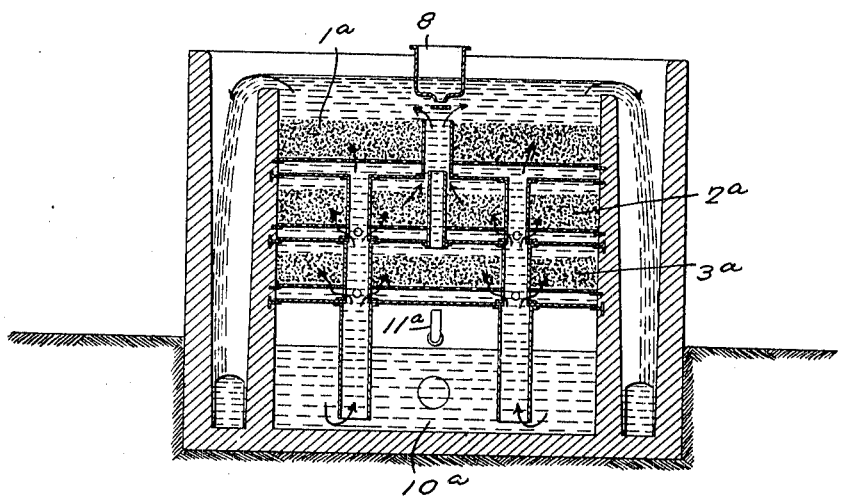

In these views: Figure 1 is a vertical longitudinal section through one of the constructions; Fig. 2 is a cross-section through the same showing it in normal operation; Fig. 3 is a view similar to the last but showing the filter during the wash-out operation; Figs. 4 and 5 are views corresponding to Figs. 2 and 3 but showing a different construction; and Fig. 6 is a fragmentary detail view on an enlarged scale.

Reference will first be had more particularly to Figs. 1 to 3 inclusive. The filter here shown has three beds 1, 2, 3 resting on suitable perforated supports 4, 5, 6 and surrounded by suitable walls 7. As indicated, the bed 1 or pre-filter bed is of coarse material, while the secondary beds 2, 3 are of fine material.

Means are provided over the top bed for supplying raw water for all the beds. As shown this means comprises a trough-like receptacle 8, extending longitudinally of the filter and having an opening or openings along its bottom, and a deflecting plate 9 beneath the same whereby the water is delivered laterally so that the flow through all portions of the bed is substantially uniform. The raw water is admitted to the trough 8 through a pipe 30 leading from a suitable source.

Beneath the lowest bed is a chamber 10 inclosed within the walls 7 and of such capacity as to hold sufficient water for washing out all of the beds by rapid backward flow, which is produced by admitting air under pressure to the upper part of the chamber through a pipe 11 leading from an air compressor or other suitable source. Water-sealed means of communication is provided between the beds on the one hand and the wash-out chamber 10 on the other hand, so that when the air is admitted to the chamber it forces the water before it backward through the beds. The wash water thus impelled passes through the beds either in succession or individually, as the case may be. As shown in Fig. 3 the backward flow of wash water, with the impurities which it carries away, escapes over the tops of the walls 7 into the gutters 12, whence it passes out through the openings 13. During the normal operation of the filter the clear water is drawn off from the chamber 10 through an exit indicated at 14, which exit is closed during the wash-out operation.

The water-sealed means of communication between the filter beds and the wash-out chamber is shown as being provided for by an air-tight wall 15 between the chamber and the lowermost bed, and one or more tubes or downtakes 16, which open at their upper ends through the said wall and plunge into the water in the chamber, extending almost to the bottom thereof. Obviously these downtakes may be of other than tubular form. In this construction all the water passes through the pre-filter and then divides, part of the flow passing through each of the fine filters. To this end a wall 17 is disposed between the beds 2 and 3 so as to cut off communication between them, and inlet and outlet ducts 18 and 19 are provided opening at one end through this wall. The ducts 18 extend upward over the bed 2, so as to receive part of the water that has percolated through the bed 1 and conduct it through the bed 2, out of contact therewith, to the bed 3. The ducts 19 extend downward below the bed 3, so as to conduct away the water that has percolated through bed 2 without coming in contact with the bed 3. The ducts 19 preferably deliver into the upper ends of the tubes 16, as shown; and there may be one or any suitable number of each kind of ducts, but preferably there is a definite, predetermined relation between the total cross-sections of the ducts and downtakes. Thus, the total cross-sectional areas of the downtakes 16 is equal to the combined total cross-sections of the ducts 18 and 19; and the total cross-sections of the two kinds of ducts are equal to each other. The ducts are preferably, though not necessarily, tubular, and are of such ample cross-section as to permit rapid washing out of the beds.

In operation, with this construction the entire supply of raw water percolates through the pre-filter 1. The filtrate from this bed enters in part into the fine bed 2 and in part into the ducts 18, by which this part is conducted to the fine bed 3. In this way the flow is divided approximately into two equal parts. The part which percolates through the bed 2 is prevented by the wall 17 from passing through the bed 3, and instead is conducted downward by the ducts 19, so as to enter the downtakes 16. The water that percolates through the bottom bed joins the filtrate from bed 2 and both pass by way of the downtakes into the wash-out chamber. Thus it will be seen that I provide means for dividing the flow that has passed through the coarse or pre-filter bed and collecting the combined filtrates of the fine beds in such manner as to enable it to be utilized to wash out all the beds when desired. The speed of filtration through the fine beds, as also of the backward flow of wash water, is half the speed through the pre-filter, which is of advantage in both operations as heretofore explained.

The construction of Figs. 4 and 5 is in general form and principle similar to the preceding construction. It has three beds $1^a$, $2^a$ and $3^a$, arranged and supported similarly to the beds in the other form, but in this instance they are all of the same size of material. Here, also, the flow of the water is divided between the beds and reunited in the wash-out chamber $10^a$, but the division is effected as to all of the beds, so that it is the raw water which is divided, a part of it flowing through each bed, the filtrates of all the beds coming together in the downtakes $16^a$. For this purpose communication is cut off between the beds $1^a$ and $2^a$, as well as between the beds $2^a$ and $3^a$, there being two impervious walls 20 and 21. Ducts 22 extend downward from the openings in the wall 20 through the bed $2^a$, so as to carry off the filtrates from bed $1^a$ out of contact with the bed beneath. In like manner ducts 23 extend downward from openings in the wall 21 through the bed $3^a$, so as to carry off the filtrate of both beds $1^a$ and $2^a$ out of contact with bed $3^a$. As shown, the ducts 22 and 23 are preferably in alinement, duct 23 in effect constituting an extension of duct 22 but being of increased cross-section because of the increased flow. The water from bed $2^a$ is enabled to enter the passage 22, 23 through suitable openings as indicated. Similarly, the downtakes $16^a$ are preferably arranged as a further continuation of the ducts, being of greater diameter than the sections 23; and the filtrate from bed $3^a$ is enabled to reach the downtakes by the provision of suitable openings, as in the case of bed $2^a$. With the construction shown it will be seen that in effect I provide continuous downtakes extending through two of the beds and into the wash-out chamber, the filtrate from the top bed entering the upper ends of these downtakes and the filtrate from the other beds finding their way into the same through entrances beneath the respective beds.

The raw water reaches the top bed directly from the supply trough $8^a$, but a part only percolates through this bed. The rest, amounting to approximately two-thirds, flows down through one or more ducts or pipes 24, the same passing through the bed 1ª to an opening in the wall 20, with which it makes a tight joint. Part of the water from the duct 24 escapes through this wall onto the bed 2ª, while the remainder, or approximately one-third of the total flow, continues down a narrow duct 25, which is in alinement with the duct 24 and delivers to the bed 3ª through an opening in the wall 21, there being a tight joint at this point also.

It will be evident that with this construction the raw water is divided into several parts, which pass through the beds individually, the filtrates from all the beds passing through the downtakes 16ª to the wash-out chamber 10ª. In order to wash out the beds air under pressure is forced into the chamber through the pipe 11ª, and the clear water rushes up the downtakes and divides. Part of it is forced upward through the material of bed 3ª and then escapes through ducts 25 and 24. Another part is forced through bed 2ª and escapes through duct 24; while the last part washes through bed 1ª.

As will be apparent to those skilled in the art numerous other combinations of beds and ducts may be effected without departing from the spirit of the invention. Thus, there may be various arrangements combining what may be termed successive and parallel flow. The first construction shown herein is successive as to the flow through beds 2 and 3, while the second construction is illustrative of what may be termed parallel or multiple flow.

Fig. 6 illustrates the preferred construction of the perforated supports on which the beds rest, the same comprising two perforated plates with wire mesh between.

What I claim as new is:

1. In a filter, the combination of a plurality of superposed filter beds, means over the top bed for delivering the water which is to pass through the several beds, means for dividing the flow of water from said means so that different parts of it pass through the material of different beds, a chamber beneath the beds to receive the filtered water therefrom, and means for admitting air under pressure to said chamber so as to drive the water therein upward through the beds.

2. In a filter, the combination of a plurality of superposed filter beds, means for dividing the water to be filtered so that different parts thereof pass through the material of different beds, a chamber adapted to receive filtered water from all the beds and to hold a sufficient quantity to wash out the same, and means for forcing the filtered water in said chamber backward through the beds when desired.

3. In a filter, the combination of a plurality of superposed filter beds, a chamber beneath the same for receiving the filtered water from the several beds, means for dividing the flow of water comprising ducts leading downward from one or more of the beds through the bed or beds beneath, and means for forcing the clear water in said chamber back through the beds and ducts for washing out when desired.

4. In a filter, the combination of a plurality of superposed filter beds, a chamber beneath the same for receiving the filtered water from the several beds, a wall between said beds and chamber, one or more downtakes extending into the latter so as to afford water-sealed means of communication between the beds and chamber, means for admitting air under pressure to said chamber when desired so as to force the water backward through said downtakes to wash out the beds, and ducts extending downward from one or more of the beds through one or more beds beneath so that the filtrate from the bed or beds above reaches said chamber without passing through the material of the bed or beds below.

5. In a filter, the combination of a plurality of superposed filter beds, a chamber beneath the same for receiving the filtered water from the several beds, a wall between said beds and chamber, one or more downtakes extending into the latter so as to afford water-sealed means of communication between the beds and chamber, means for admitting air under pressure to said chamber when desired so as to force the water backward through said downtakes to wash out the beds, a wall between two of the beds, and one or more ducts extending downward from said wall through the bed or beds below and delivering into said downtakes.

6. In a filter the combination of a plurality of superposed filter beds, a chamber beneath said beds to receive the filtered water therefrom, means whereby the water which percolates through an upper bed is divided so that different parts thereof are caused to percolate through different beds below, and means for forcing the water in said chamber backward through the beds when desired.

7. In a filter, the combination of a plurality of superposed filter beds, and means for cutting off communication between certain beds and for conducting water to the lower and from the upper of these beds, said means comprising a division wall between the beds and ducts which open at one end through said wall and extend, respectively, upward over the bed above the wall and downward below the bed beneath the wall.

8. In a filter, the combination of three or more superposed filter beds, comprising a relatively coarse pre-filter and finer beds beneath, means for supplying the water to be filtered to the pre-filter, and means for dividing the water that percolates through the pre-filter among the fine beds, the last-mentioned means comprising a wall between said fine beds and ducts at opposite sides of the wall leading downward, respectively, to the fine bed beneath the wall and from the fine bed above the wall.

9. In a filter, the combination of a plurality of superposed filter beds, comprising a pre-filter bed and secondary filter beds among which the water from the pre-filter bed is divided, a chamber beneath the beds to receive filtered water therefrom, a wall between said chamber and the beds, and one or more downtakes plunging into the water in said chamber so as to afford water-sealed means of communication between the beds and chamber, in combination with a wall cutting off communication between the secondary filter beds, one or more inlet ducts leading from above the upper of these secondary beds to the lower thereof, one or more outlet ducts leading from the upper of said beds below the lower secondary bed, and means for admitting air under pressure to said chamber to force the water therein backward through the downtakes, ducts and beds.

10. In a filter, the combination of a plurality of superposed filter beds, comprising a pre-filter bed of coarse material at the top and secondary filter beds of fine material beneath the same, means for supplying to the pre-filter bed the raw water that is to percolate through the several beds, a chamber of substantial capacity for the reception of filtered water from all the beds, and means whereby air may be forced into said chamber so as to drive the clear water backward through all the beds for washing out.

11. In a filter, a plurality of superposed filter beds, means thereover for supplying the raw water, a chamber beneath the beds to receive the filtered water, a wall separating the chamber from the beds, and downtakes extending from said wall toward the bottom of the chamber, in combination with means for dividing the flow of water among different beds and for reuniting the filtrates so as to pass together through said downtakes, comprising one or more walls separating the beds and inlet and outlet ducts leading through the beds and opening through the last-mentioned wall or walls.

12. In a filter, the combination of a plurality of superposed filter beds, means for supplying raw water thereto, a wash-out chamber for filtered water, water-sealed means of communication between the beds on the one hand and the chamber on the other hand, a wall or walls cutting off communication between adjacent beds, and ducts passing through certain beds for directing the flow with reference to other beds.

In testimony whereof, I have signed my name to this specification, in the presence of two subscribing witnesses.

HANS REISERT.

Witnesses:
W. F. BISSING,
J. J. KOZINN.

---

Copies of this patent may be obtained for five cents each, by addressing the "Commissioner of Patents, Washington, D. C."